US010387428B2

(12) United States Patent
Ballantine et al.

(10) Patent No.: US 10,387,428 B2
(45) Date of Patent: *Aug. 20, 2019

(54) DATA ENTRY COMMENTARY AND SHEET RECONSTRUCTION FOR MULTIDIMENSIONAL ENTERPRISE SYSTEM

(71) Applicant: International Business Machines Corporation, Armonk, NY (US)

(72) Inventors: Peter R. Ballantine, Dunrobin (CA); Sasa Conic, Ottawa (CA); Johnathan Hodge, Croydon (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,932

(22) Filed: Dec. 31, 2015

(65) Prior Publication Data

US 2016/0110425 A1    Apr. 21, 2016

Related U.S. Application Data

(63) Continuation of application No. 11/950,257, filed on Dec. 4, 2007, now Pat. No. 9,268,837.

(51) Int. Cl.
*G06F 16/2457* (2019.01)
*G06F 16/22* (2019.01)
(Continued)

(52) U.S. Cl.
CPC ........ *G06F 16/24573* (2019.01); *G06F 16/22* (2019.01); *G06F 16/2264* (2019.01);
(Continued)

(58) Field of Classification Search
CPC ........... G06F 17/30525; G06F 17/2235; G06F 16/24573; G06F 16/22
(Continued)

(56) References Cited

U.S. PATENT DOCUMENTS

| 4,878,175 A | 10/1989 | Norden-Paul et al. |
| 5,247,611 A | 9/1993 | Norden-Paul et al. |

(Continued)

FOREIGN PATENT DOCUMENTS

| EP | 0501180 A2 | 9/1992 |
| WO | 84/00426 | 2/1984 |
| WO | 00/42530 | 7/2000 |

OTHER PUBLICATIONS

"XML Inclusions (XInclude) Version 1.0," W3C Recommendation, retrieved from http://www.w3.org!TR/2004/REC-xinclude-20041220/, Dec. 20, 2004, 20 pp.
(Continued)

*Primary Examiner* — Jensen Hu
(74) *Attorney, Agent, or Firm* — Shumaker & Sieffert, P.A.

(57) ABSTRACT

A computing device is described that includes a user interface to receive contribution data of an enterprise and to display a sheet of the contribution data, an annotation interface module to receive one or more annotations for objects of the contribution data, a planning application to retrieve a context definition defining a context in which each of the annotations was received, and an annotation table to store each of the annotations and the context definition corresponding to each of the annotations. The user interface may be configured to output the annotations. The computing device may improve the collaborative process of developing multidimensional data. Users of the computing device may quickly and easily share their thoughts, questions, and comments about the data through annotations. Recreating an annotated sheet may be done efficiently by storing relevant coordinates.

10 Claims, 11 Drawing Sheets

(51) Int. Cl.
*G06F 16/28* (2019.01)
*G06F 17/22* (2006.01)
*G06F 17/24* (2006.01)

(52) U.S. Cl.
CPC ...... *G06F 16/24575* (2019.01); *G06F 16/283* (2019.01); *G06F 17/2235* (2013.01); *G06F 17/241* (2013.01)

(58) Field of Classification Search
USPC ........................................................ 707/796
See application file for complete search history.

(56) References Cited

U.S. PATENT DOCUMENTS

| | | | |
|---|---|---|---|
| 5,325,478 | A | 6/1994 | Shelton et al. |
| 5,546,580 | A | 8/1996 | Seliger et al. |
| 5,546,680 | A | 8/1996 | Barma et al. |
| 5,590,259 | A | 12/1996 | Anderson et al. |
| 5,701,423 | A | 12/1997 | Crozier |
| 5,899,998 | A | 5/1999 | McGauley et al. |
| 6,167,405 | A | 12/2000 | Rosensteel, Jr. et al. |
| 6,282,551 | B1 | 8/2001 | Anderson et al. |
| 6,496,913 | B1 | 12/2002 | Taugher et al. |
| 6,546,095 | B1 | 4/2003 | Iverson et al. |
| 6,944,821 | B1 | 9/2005 | Bates et al. |
| 7,043,497 | B1 | 5/2006 | Carty et al. |
| 7,082,427 | B1 | 7/2006 | Seibel et al. |
| 7,191,183 | B1 | 3/2007 | Goldstein |
| 7,197,502 | B2 | 3/2007 | Feinsmith |
| 7,233,952 | B1 | 6/2007 | Chen |
| 7,266,540 | B2 | 9/2007 | Chung et al. |
| 7,536,713 | B1 | 5/2009 | Bartholomew |
| 7,877,355 | B2 | 1/2011 | Borgsmidt et al. |
| 8,347,207 | B2 | 1/2013 | Borgsmidt et al. |
| 8,468,125 | B2 | 6/2013 | Tarnoff et al. |
| 2004/0107255 | A1 | 6/2004 | Ludwig et al. |
| 2004/0162836 | A1 | 8/2004 | Aronoff et al. |
| 2004/0216032 | A1* | 10/2004 | Amitay ............. G06F 17/241 |
| | | | 715/230 |
| 2005/0278458 | A1 | 12/2005 | Berger et al. |
| 2006/0022048 | A1 | 2/2006 | Johnson |
| 2006/0112153 | A1 | 5/2006 | Bowen |
| 2006/0112390 | A1 | 5/2006 | Hamaoka |
| 2006/0230025 | A1 | 10/2006 | Baelen |
| 2006/0230067 | A1 | 10/2006 | Tarnoff et al. |
| 2007/0027904 | A1 | 2/2007 | Chow et al. |
| 2007/0234198 | A1 | 10/2007 | Tien et al. |
| 2008/0046481 | A1 | 2/2008 | Gould et al. |
| 2008/0208880 | A1 | 8/2008 | Dong et al. |
| 2008/0244377 | A1* | 10/2008 | Erwig ............... G06F 17/246 |
| | | | 715/212 |
| 2008/0249761 | A1 | 10/2008 | Easterly |
| 2008/0301155 | A1 | 12/2008 | Borgsmidt |
| 2009/0144313 | A1 | 6/2009 | Hodge et al. |

OTHER PUBLICATIONS

Sanjay Goil and Alok Choudhary, "An Infrastructure for Scalable Parallel Multidimensional Analysis," Scientific and Statistical Database Management, Eleventh International Conference, IEEE Comput. Soc, US, Jul. 28, 1999 (pp. 102-111).

Joe Guerra, "Using Microsoft SQL Server Data Transformation Services with IBM Databases," dated Nov. 2002; Internet Article retrieved from URL http://www.microsoft.com/sql/evaluation/compare/ibm/UsingMSSS-DTSwIBM-DBs.pdf (retrieved on Jul. 27, 2006) pp. 1-19.

Prosecution History from U.S. Appl. No. 11/950,257, dated Feb. 1, 2010-Oct. 28, 2015 116 pgs.

Prosecution History from U.S. Appl. No. 11/954,415, dated Jan. 11, 2011-Aug. 27, 2012 138 pgs.

Prosecution History from U.S. Appl. No. 11/103,902, dated Aug. 9, 2007-Feb. 11, 2013 105 pgs.

Prosecution History from U.S. Appl. No. 11/900,895, dated Dec. 1, 2009-Sep. 20, 2010 96 pgs.

* cited by examiner

DATA ENTRY COMMENTARY AND SHEET RECONSTRUCTION FOR MULTIDIMENSIONAL ENTERPRISE SYSTEM

This application is a continuation of U.S. application Ser. No. 11/950,257, filed Dec. 4, 2007, the entire content of which is hereby incorporated by reference.

TECHNICAL FIELD

The invention relates to enterprise systems, for example, enterprise planning and performance management systems.

BACKGROUND

Enterprise software systems are typically, sophisticated, large-scale systems that support many, e.g., hundreds or thousands, of concurrent users. Examples of enterprise software systems include inventory management systems, budget planning systems, order management systems, inventory management systems, sales force management systems, business intelligence tools, enterprise reporting tools, project and resource management systems, and other enterprise software systems.

A computing device for a user typically connects to the enterprise software system via a computing network. The user computing device may provide an operating environment for concurrent execution of multiple planning applications that access multidimensional data stored to a cache on the computing device. Typically, the user computing device includes a cache to store datasets requested by the user. In many cases the cache stores complex, multidimensional datasets, i.e., data cubes, which the user computing device may download from the enterprise software system via the network connection.

Various users may enter, review, and/or change data in an enterprise system using the computing device. For example, a contributor may enter data in a cell, and a reviewer may review the data in the cell. The reviewer may accept, reject, or change the data. The reviewer may request that the contributor to look over the changes or re-work the data in light of the review when the reviewer changes or rejects the data.

SUMMARY

In general, the invention is directed to techniques for annotating data of an enterprise system. An enterprise system may store data in one or more multidimensional databases or data cubes. A user of the enterprise system may retrieve, observe, manipulate, and/or store the data within a sheet presentation of a view of the data. A plurality of users may cooperatively develop the data, and each of the users may need to recreate the same sheet of a particular data cube. The techniques described herein may improve the cooperative development of the data by enabling the users to communicate with each other through the use of annotations.

The techniques described herein may enable users to annotate various objects of the data. An annotation may include either or both of text-based commentary and attaching a file to the annotated data object. For example, a user may have a question or comment about a particular cell of a particular sheet. The user may be, for example, a reviewer who would like clarification about a particular data entry, such as how a different user, e.g. a contributor, arrived at the particular entry. An annotation from the reviewer may only be relevant with respect to a specific sheet. According to the techniques described herein, the enterprise system may store the annotation along with a context that defines the sheet and the coordinates of the cell to which the annotation applies. The context definition may define how to recreate the sheet, and the coordinates may identify a particular cell of the sheet. A computing device may use the context to recreate the sheet and the coordinates to identify a particular annotated cell.

The contributor may see that an annotation exists and instruct a computing device to recreate the sheet for which the annotation was relevant according to the context in which the annotation was entered. The contributor may then take an appropriate action with respect to the annotation. For example, the contributor may alter the entry or reply with an additional annotation explaining the reasons behind the particular entry. If the contributor replies with an additional annotation, the reviewer may again retrieve the data and see the original annotation as well as the annotation from the contributor. The techniques described herein may also enable a user to enter an annotation for other objects, such as the sheet as a whole or an entire data cube, and the techniques may permit other users to quickly recreate the view and observe the annotation.

In one embodiment, a method comprises receiving contribution data of an enterprise in accordance with a multi-level enterprise model, storing the contribution data within a database, receiving a first annotation for an object of the contribution data, retrieving a context definition defining a context in which the first annotation was received, receiving a second annotation for the object within the same context as the context in which the first annotation was received, storing the first annotation, the second annotation, and the context definition, and outputting the first annotation and the second annotation.

In another embodiment, a method comprises retrieving contribution data from an enterprise system, retrieving a first annotation for an object of the contribution data from the enterprise system, retrieving a context definition defining a context in which the first annotation was entered, generating a link to the context defined by the context definition, and outputting the link.

In another embodiment, a computing device includes a user interface to receive contribution data of an enterprise and to display a sheet of the contribution data. The computing device also includes an annotation interface module to receive one or more annotations for objects of the contribution data. The computing device further includes a planning application to retrieve a context definition defining a context in which each of the annotations was received. Moreover, the computing device includes an annotation table to store each of the annotations and the context definition corresponding to each of the annotations, wherein the user interface is configured to output the annotations.

In another embodiment, the invention is directed to a computer-readable medium containing instructions. The computer-readable medium may be a computer-readable storage medium, such as, for example, random access memory (RAM), read only memory (ROM), programmable ROM (PROM), erasable PROM (EPROM), electronically erasable PROM (EEPROM), flash memory, or other suitable memory. The instructions cause a programmable processor to receive contribution data of an enterprise in accordance with a multi-level enterprise model, store the contribution data within a database, receive a first annotation for an object of the contribution data, retrieve a context definition defining a context in which the first annotation was received, receive a second annotation for the object within the same context as the context in which the first annotation was received, store the first annotation, the second annotation, and the context definition, and display the first annotation and the second annotation to a user.

The techniques described herein may offer several advantages. For example, the techniques may improve the collaborative process of developing multidimensional data. With the ability of a user to add annotations to a particular entry or a view of the data, users of the enterprise system may quickly and easily share their thoughts, questions, and comments about the data. These annotations may only be relevant with respect to a particular view. Because of the many possible sheets that are possible to create, a specific sheet may be difficult, if not impossible, to recreate, either by the system itself or from a user's memory. By storing the context that defines a specific sheet, recreating a specific sheet may be done efficiently and may easily allow users who work with the same data to coordinate their efforts toward contribution and review of the data more efficiently.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5 is an example screen illustration of a user interface for viewing and entering enterprise planning data.

FIG. 6 is an example screen illustration of a user interface for requesting to enter an annotation.

FIG. 7 is an example screen illustration of a user interface upon which an annotation entry window is superimposed.

FIG. 8 is an example screen illustration of a user interface displaying an annotation viewing window for a cell of planning data in a table.

FIG. 10 is an example screen illustration of a user interface displaying an annotation viewing window that includes multiple annotations for a cell of planning data in a table.

DETAILED DESCRIPTION

Figure 1:
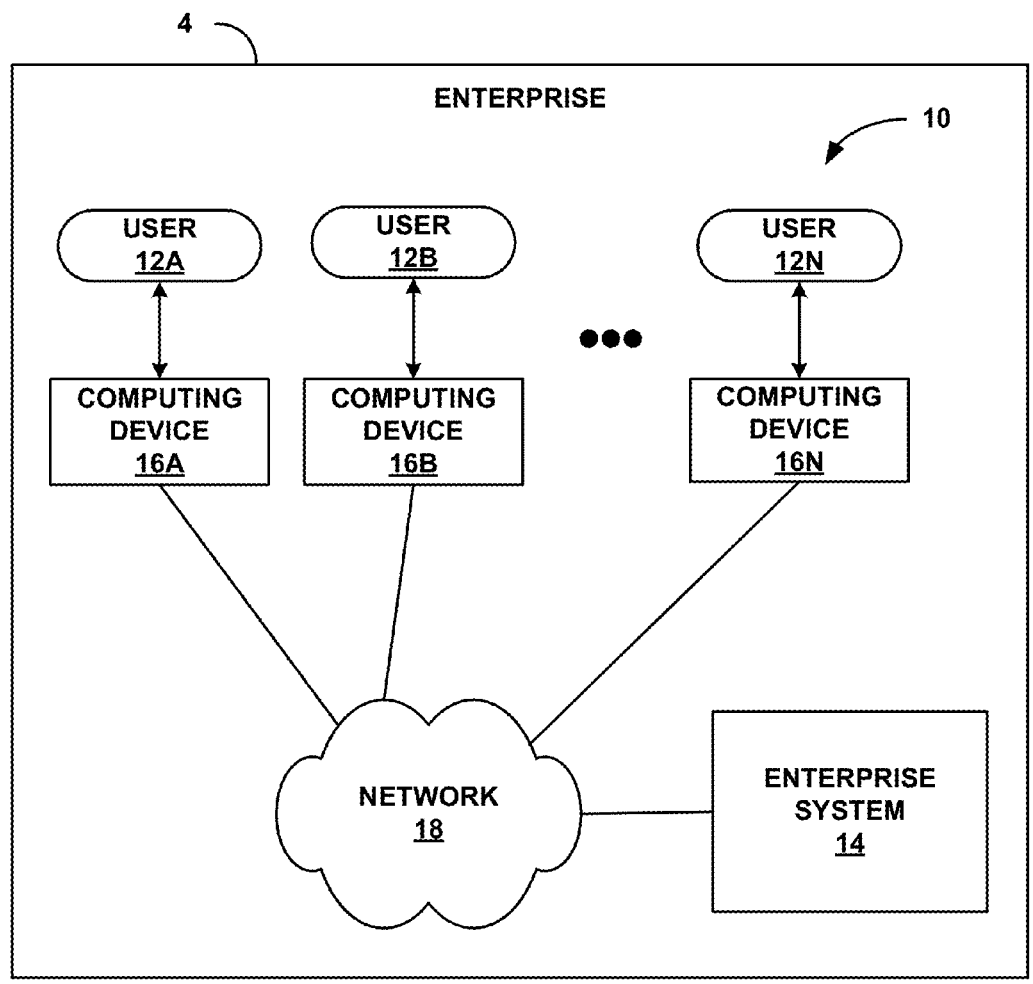
FIG. 1 is a block diagram illustrating an example enterprise having a computing environment in which a plurality of users interact with an enterprise system.

FIG. 1 is a block diagram illustrating an example enterprise 4 having a computing environment 10 in which a plurality of users 12A-12N ("users 12") access an enterprise system 14, such as an enterprise planning system. In the system shown in FIG. 1, enterprise system 14 communicatively couples to a number of computing devices 16A-16N ("computing devices 16") by a network 18. Users 12 may interact with computing devices 16 to access enterprise system 14. Although FIG. 1 depicts a one-to-one correspondence between users 12 and computing devices 16, other embodiments may permit any number of users to access a particular one of computing devices 16. Likewise, one user, e.g. user 12A, may have access to a plurality of computing devices 16.

Enterprise users 12 may utilize a variety of computing devices to interact with enterprise system 14 via network 18. For example, an enterprise user may interact with enterprise system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise system 14 via a local area network, or may remotely access enterprise system 14 via a virtual private network, remote dial-up, or similar remote access communication mechanism.

For exemplary purposes, the invention will be described in reference to a performance management and enterprise planning system, such as an enterprise-wide financial management system or budget planning system. The techniques described herein may be readily applied to other software systems, including other large-scale enterprise software systems. Examples of enterprise software systems include order management systems, inventory management systems, sales force management systems, business intelligence tools, enterprise reporting tools, project and resource management systems and other enterprise software systems.

In one example embodiment, enterprise system 14 enables and automates the reconciliation of top-down targets with detailed bottom-up forecasts for an enterprise. Enterprise system 14 implements and manages an enterprise planning process, which can be divided into three stages: (1) a modeling stage during which a model is constructed, (2) a contribution stage during which planning data is collected, and (3) a review and performance management stage during which the planning data can be selectively accepted and analyzed.

Initially, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts specify corporate target data for each node of the organizational hierarchy. Corporate target data may include financial data, revenue data, order data, inventory data, and the like, depending on the particular enterprise planning activity being carried out by the enterprise.

Next, the analysts assign one or more enterprise users to each node, such as managers, supervisors, sales representatives, lab managers, or the like, that are responsible for enterprise planning for the cost center corresponding to the node. Each enterprise user may be designated as a contributor that provides planning data to enterprise system 14, a reviewer that accepts or rejects contributions from the contributors, or both. The contributors and reviewers may be authorized users within the enterprise, e.g. users 12, or within other entities coupled to network 18, such as suppliers or customers.

Typically, enterprise users 12 that are designated as contributors interact with enterprise system 14 to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise. Users 12 may also enter and/or review annotations from other users 12 in accordance with the techniques as described in greater detail below.

Enterprise system 14 automates the reconciliation of the forecast data with the corporate target data provided by the analysts. In particular, enterprise system 14 operates in accordance with a defined model, i.e., the enterprise planning model created by the analysts, to provide a hierarchical planning process having multiple reconciliation levels. As each of the contributors provides his or her contribution data, enterprise system 14 automatically aggregates the contribution data across the enterprise in real-time, and provides access to the aggregated data to enterprise users 12 designated as reviewers associated with higher levels of the enterprise. In particular, upon receiving contribution data from the contributors, enterprise system 14 identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise system 14 ensures that the reviewers, as defined by the nodes of the enterprise model, reconcile the target data with the forecast data. Each of the reviewers may, for example, reject or accept the contribution data in view of corporate targets provided by the analysts. Moreover, enterprise system 14 may enable a user to annotate an entry of contribution data. Enterprise system 14 may store characteristics of the sheet in which a user entered an annotation at the time of the annotation in order to enable simple recreation of the sheet by the same user or a subsequent user who would like to review the annotation. The process of reviewing and accepting or rejecting, revising, and again reviewing continues until the contribution data is ultimately approved by the highest level of the organizational hierarchy, thereby ensuring that the contribution data from the contributors reconciles with corporate targets provided by the analysts. The ability to annotate data and to review the annotations may improve the efficiency of this process.

An annotation may contain various information. For example, the annotation may contain the name or a user identification (ID) of the user who entered the annotation, the date/time at which the annotation was entered, the value of the object being annotated at the time of the annotation, and a comment from the user. As an example of a situation in which an annotation may be used, a contributor may annotate an entry that the contributor believes is especially important, about which the contributor is unsure or has a question, or for other various reasons. As another example, a reviewer may also wish to annotate certain entries, such as an entry that the reviewer believes has an incorrect value. The reviewer may also add a second annotation to an entry from a contributor when the contributor has annotated the entry, for example, to ask a question. Enterprise system 14 may store an entire history of annotations for a particular entry. In continuing with the example, enterprise system 14 may store the original annotation from the contributor as well as the annotation from the reviewer. Each annotation may include the name/identification of the annotator, the date/time at which the annotation was entered, the specific value of the entry at the time of the annotation, a dimensional context for the annotation, such as the coordinates, and comments from the annotator.

Additionally, a user may annotate a cell or other data object by attaching a document or other file to the data object to be annotated. Enterprise system 14 may present an interface by which a user may request to attach a document to, for example, a cell. The user may then attach a particular document to the cell. When a subsequent user requests to view the comment, enterprise system 14 may open the attached document and display the attached document to the user.

Enterprise system 14 may enable annotations of any type of object associated with the data. In one embodiment, enterprise system 14 may permit annotation of an entire sheet. In this case, the annotation need not contain the current value(s) of any of the entries in the sheet. Enterprise system 14 may store coordinates defining how to reconstruct the sheet when an annotation is relevant to the entire sheet. Moreover, enterprise system 14 may store a history of annotations with respect to the entire sheet if another user enters an annotation relevant to the same sheet in which a different user had previously entered an annotation. In some embodiments, enterprise system 14 may enable annotation of all objects associated with multidimensional data, such as cells, sheets, datacubes, or other such objects.

Enterprise system 14 may enable organizations to reconcile corporate models and organizational targets with detailed forecasts. Enterprise system 14 may provide a platform that delivers collaborative, real-time planning capabilities, without requiring offline consolidation and aggregation of forecasts. Because enterprise system 14 can aggregate contribution data in real-time, all users 12 can be presented with an accurate, up-to-date view of the numbers. Enterprise system 14 may also present all users 12 with the ability to view annotations. Further, the architecture of enterprise system 14 can readily scale to thousands of users, and may be designed around best planning practices. In addition, the techniques enabling high participation by enterprise users 12, i.e., the contributors and reviewers, allowing accurate planning cycles to be reduced.

Enterprise system 14 may utilize a "cut-down" process by which the multidimensional data store is "sliced" for each user 12 in accordance with the defined enterprise model. During this process, enterprise system 14 identifies areas of the defined model to which users 12 are assigned, either as contributors or reviewers, and "slices" the data store based on the assignments. When a given user 12 logs in and proceeds with an enterprise planning activity, enterprise system 14 communicates the respective data slice to the respective computing device 16 for display to the user via the extended spreadsheet application. In this fashion, enterprise system 14 need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

A computing device, such computing device 16A, may represent a particular slice of a data cube with one or more sheets. A sheet may be, for example, a cross tab display similar to a spreadsheet document. As described herein, sheets relate to a two-dimensional representation of data from a multidimensional data cube. On the other hand, a spreadsheet document, such as a Microsoft Excel document, is typically a representation of two dimensional data from a relational database. Although a sheet typically may not simultaneously display data for each of the plurality of dimensions from which the sheet is derived (due in part to the two-dimensional nature of display devices, such as monitors), sheets generally contain data retrieved from a plurality of dimensions of a data cube. For example, the sheet may select one value for each of certain dimensions, e.g. all but two of the dimensions, of the data cube. The sheet may then display all data for the two other dimensions in a cross tab display.

The techniques described herein may offer several advantages. For example, the techniques may improve the collaborative process of developing multidimensional data. With the ability of users 12 to add annotations to a particular cell or other object associated with the data, users 12 of enterprise system 14 may quickly and easily share their thoughts and questions about the data. These annotations may only be relevant with respect to a particular sheet. Because of the many possible sheets that are possible to view, a specific sheet may be difficult to recreate by the system itself or from a user's memory. By storing the coordinates of, for example, a cell to which an annotation relates, recreating a specific sheet may be done efficiently and may easily allow users who work with the same data to coordinate their efforts in a more efficient fashion.

Figure 2:
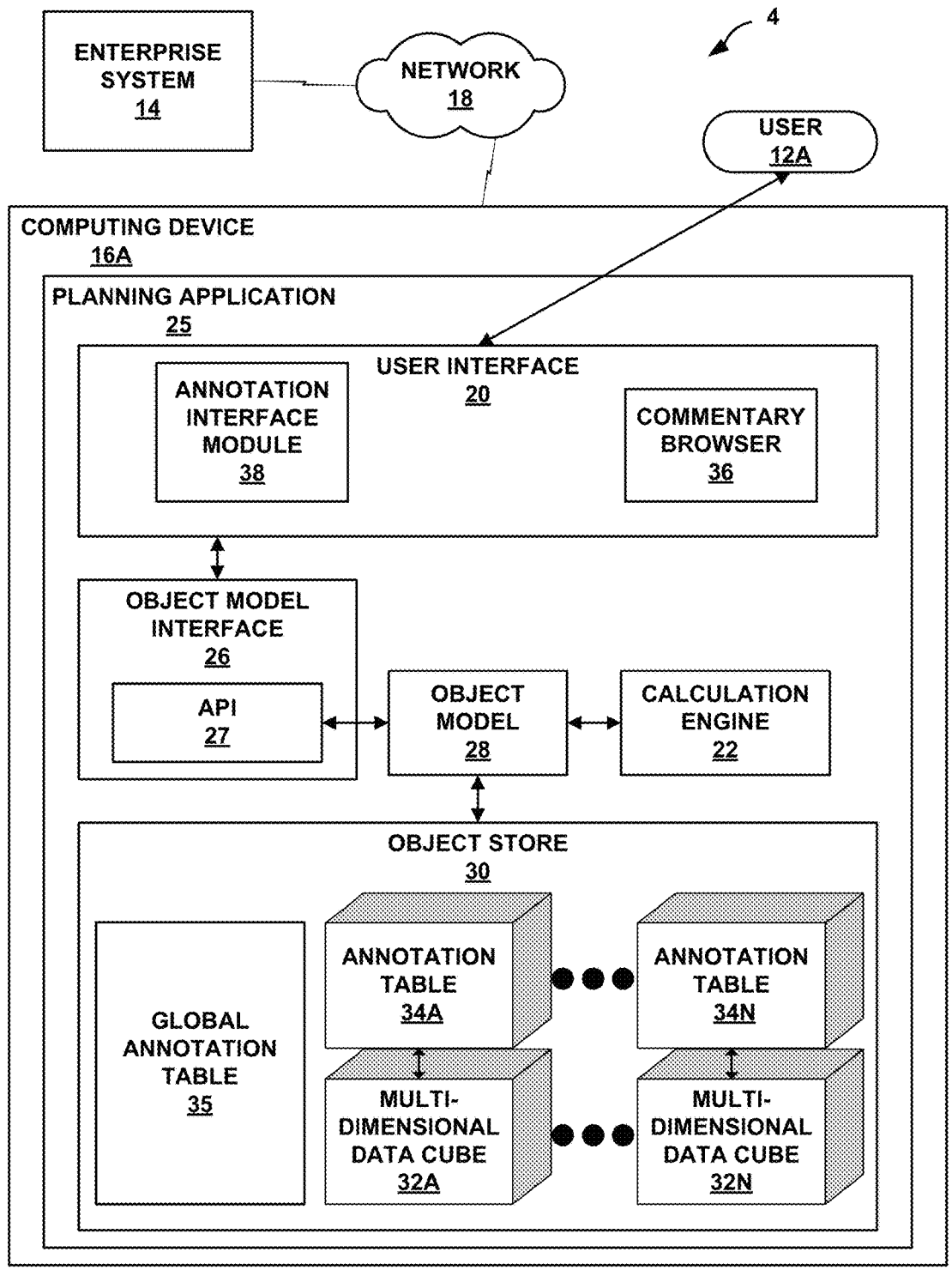
FIG. 2 is a block diagram illustrating an example embodiment of a computing device for interacting with the enterprise system.

FIG. 2 is a block diagram illustrating one embodiment of a computing device 16A for interacting with enterprise system 14. In the exemplary embodiment, computing device 16A includes planning application 25 that includes a user interface 20, a calculation engine 22, an object model interface 26, an object model 28, and an object store 30. Computing device 16A may include computer-readable media to store executable instructions for causing a programmable processor to carry out the methods described herein. The computer-readable media may be computer-readable storage media, such as RAM, ROM, PROM, EEPROM, or other suitable computer-readable media.

Planning application 25 represents a planning application executing on computing device 16A. For example, planning application 25 may include user interface tools, reporting tools, modeling tools, spreadsheet applications, data collection templates, business intelligence tools, or other types of enterprise planning applications. Planning application 25 may specify operations that object model 28 performs upon data cubes 32 through interactions with object model interface 26.

Object model interface 26 comprises an application programming interface (API) 27 that exposes object model 28. For example, object model 28 may be a metadata model for data cubes 32 that represent multidimensional data from one or more data cubes. Object store 30 may comprise memory, such as a cache, that stores specific instantiations of object model 28. Multidimensional data cubes 32A-32N ("data cubes 32") of object store 30 each store multidimensional data in accordance with object model 28.

In general, object model 28 represents any hierarchy of data objects, and may comprise a series of collections and objects within the collections. In other words, object model 28 may comprise a hierarchy of objects, each of which contains a collection which in turn provides access to one or more objects. Object model 28 may be wrapped to protect the objects within the collections. In this way, user 12A and planning application 25 cannot directly alter the data within object store 30 of object model 28. Instead, planning application 25 interacts with object model 28 via object model interface 26, and more particularly API 27, to specify operations object model 28 may perform. In particular, object model interface 26 receives operation calls from planning application 25 via API 27 and may return the result of the operations to planning application 25.

In the example of enterprise planning, user 12A may interact with user interface 20 to enter and manipulate enterprise planning data, such as budget or forecast data. User interface 20 may be, for example, a web browser front-end such as an ActiveX component, a Java applet, or any other suitable web browser front-end. As another example, user interface 20 may be a graphical user interface (GUI), for example, a GUI compatible with Microsoft Windows, the X Window System, Aqua, or other user interface and/or windowing systems.

Data cubes 32 may store multidimensional planning data, which may include top-down targets, and bottom-up contribution data, and may allow all calculations for an enterprise planning session to be performed locally by computing device 16A using, e.g., calculation engine 22.

Object model 28 may maintain annotation tables 24A-24N ("annotation tables 24") in object store 30. In the example embodiment as shown in FIG. 2, object model 28 maintains one annotation table per multidimensional data cube, as well as a global annotation table 35. Although illustrated in FIG. 2 as separate tables for the purpose of clarity, annotation tables 24 may be incorporated into respective ones of data cubes 32. For example, data cube 32A may include an "annotations" dimension, which may include cells that store annotations for other cells in data cube 32A.

Planning application 25 may retrieve annotation data from enterprise system 14 through network 18 in addition to retrieving multidimensional data. Object model 28 may store annotations relevant to data cubes 32 in corresponding annotation tables 24. Entries in annotation tables 24 may be relevant to a particular cell, sheet, data cube, or other higher-order data object. For example, an annotation in annotation table 24A relevant to a particular cell may store the coordinates of the relevant cell of data cube 34A as well as a context definition defining the context in which the annotation was entered. As another example, an annotation in annotation table 24A may relate to data cube 32A in its entirety.

Global annotation table 35 may include entries that store annotations for individual ones of data cubes 32, for a set of two or more of data cubes 32, for user planning data as a whole, and/or for other objects of enterprise system 14. Although illustrated in FIG. 2 as a separate table for purposes of clarity, global annotation table 35 may be incorporated into one or more of annotation tables 24 or into one or more of data cubes 32.

User interface 20 may include annotation interface (IF) module 38 and commentary browser 36. User interface 20 may present an interface by which a user, such as user 12A, may interact with a particular sheet. A sheet, as described above, may be a particular view of the data stored in object store 30. For example, a sheet may present a cross tab display, such as a spreadsheet view, of the data, wherein two of the dimensions of a multidimensional data cube may be displayed in full, while the remaining dimensions are isolated to a single value for each dimension. A sheet may also present an aggregation of the data, for example, as a result of a multidimensional data query. User interface 20 may receive a request for a particular sheet from user 12A. User interface 20 may transmit the request to object model 28 through object model interface 26 to retrieve the requested data in order to populate the sheet with the correct values. Planning application 25 may retrieve multidimensional data from enterprise system 14 through network 18 with which to populate data cubes 32. For example, planning application 25 may retrieve data corresponding to one or more data cubes from enterprise system 14.

Annotation IF module 38 may present an interface by which a user, such as user 12A, may enter an annotation with respect to a particular cell or other object. Annotation IF module 38 may retrieve the definition of the current sheet from user interface 20. For example, annotation IF module 38 may retrieve information defining what dimensions were used to create the sheet. Annotation IF module 38 may store the definition of the current sheet along with an annotation entered by user 12A such that when the annotation is retrieved, by either user 12A or by another user, e.g., user 12B, user interface 20 may reconstruct the sheet in which the annotation was entered. In this way, the user retrieving the annotation may more accurately interpret the annotation because the retrieving user may readily observe the context in which the annotation was entered.

A context is generally the sheet or other display in which a particular annotation is received. For example, a data cube may have N dimensions $D_i$, $1 \leq i \leq N$. The data cube may be defined as $\{D_1, D_2, \ldots, D_N\}$. A cell of the data cube may be defined as $\{D_1[x_1], D_2[x_2], \ldots, D_N[x_N]\}$, where $1 \leq x_i \leq |D_i|$. A sheet of the data cube may be defined as $\{D_1[x_1], \ldots, D_j, \ldots, D_k, \ldots, D_N[x_N]\}$ for some j, k such that $1 \leq j \leq N$, $1 \leq k \leq N$, and $j \neq k$. Thus the context of an annotation for a particular cell $\{D_j[a], D_k[b]\}$ of the sheet is the sheet itself, i.e. $\{D_1[x_1], \ldots, D_j, \ldots, D_k, \ldots, D_N[x_N]\}$. Planning application 25 may store an annotation in a corresponding one of annotation tables 24, as well as the definition of the context in which the annotation was entered. When the annotation relates to a particular cell, planning application 25 may further store the coordinates of the cell in the corresponding one of annotation tables 24.

Annotation IF module 38 may also enable users 12 to enter a plurality of annotations with respect to the same data entry. For example, user 12A may initially enter an annotation for a cell, and later, user 12B may enter an annotation for the same cell. Likewise, user 12A may enter an additional annotation for a cell for which user 12A has already entered an annotation, with or without an annotation from a different one of users 12. Annotation IF module 38 may maintain a list, such as an array, a linked list, or other data structure storing annotations for the cell in annotation tables 24. Each of the annotations in annotation tables 24 may include, for example, the name or user ID of the user who entered the annotation, the date on which the annotation was entered, the current value of the cell for which the annotation is entered, and comments from the user. User interface 20 may present each of the annotations to a user viewing the sheet containing the cell for which the annotations were entered.

As an example, user 12A, who may be a contributor, can modify his or her respective contribution data, and perform calculations necessary for the enterprise planning process without necessarily accessing enterprise system 14. User 12A may also enter an annotation with respect to a cell, a sheet, or other data object using annotation IF module 38. User 12A may save the planning data locally, and submit the planning data, including the annotations, to enterprise system 14 for aggregation with the planning data from other users 12. One or more of the other users 12 may enter further annotations or delete annotations from user 12A.

An annotation may be stored along with a definition of the context in which the annotation was entered. For example, a data cube may include five dimensions {A, B, C, D, E}. One of users 12, such as user 12A, may request the sheet defined by particular values of dimensions A, B, and D, e.g. A[3], B[2], D[7] while requesting C×E as a cross-tab display, wherein the notation M[i] denotes the ith value of dimension M. User 12A may then enter an annotation in, e.g., cell C[5], E[13]. An entry stored in a corresponding one of annotation tables 24 may include the annotation data, such as user name, date, comment, and/or current value of the cell, the definition of the context, i.e. the sheet definition {A[3], B[2], D[7], C×E}, and the index of the annotated cell, i.e. C[5], E[13].

Planning application 25 may determine whether annotations exist with respect to a requested sheet or any of the cells of the sheet when populating the sheet with the data. For example, planning application 25 may search annotation tables 24 and global annotation table 35 for annotations relating to cells or other objects of data cubes 32. For each cell or other object for which an annotation exists, user interface 20 may present an indication to user 12A that an annotation exists. For example, when a particular cell includes an annotation, user interface 20 may present a flag within the cell, as shown in the exemplary screenshot of FIG. 8. User interface 20 may indicate the existence of an annotation in other ways as well, such as highlighting the annotated cell in a particular color, presenting the text of the annotated cell in bold, italics, underline, or a different font, outlining the annotated cell with a border or partial border, or by other means.

User interface 20 may display an annotation when user 12A requests to view the annotation. For example, user 12A may request to view the annotation by using a pointer controlled by a mouse attached to computing device 16A to hover over the cell for which an annotation exists; user interface 20 may interpret the hovering as a request to view the annotation and, when user 12A moves the pointer away from the annotated cell, user interface 20 may determine that user 12A no longer wishes to view the annotation. User interface 20 may display the annotation, for example, as a "tooltip," i.e. a window that appears next to the annotated cell after the pointer has hovered over the annotated cell for a certain period of time and that disappears when the pointer is moved away from the annotated cell. User interface 20 may also display the annotation by other means, for example, by opening a new window containing the annotation or by presenting the annotation in a separate frame of the current window.

Figure 11:
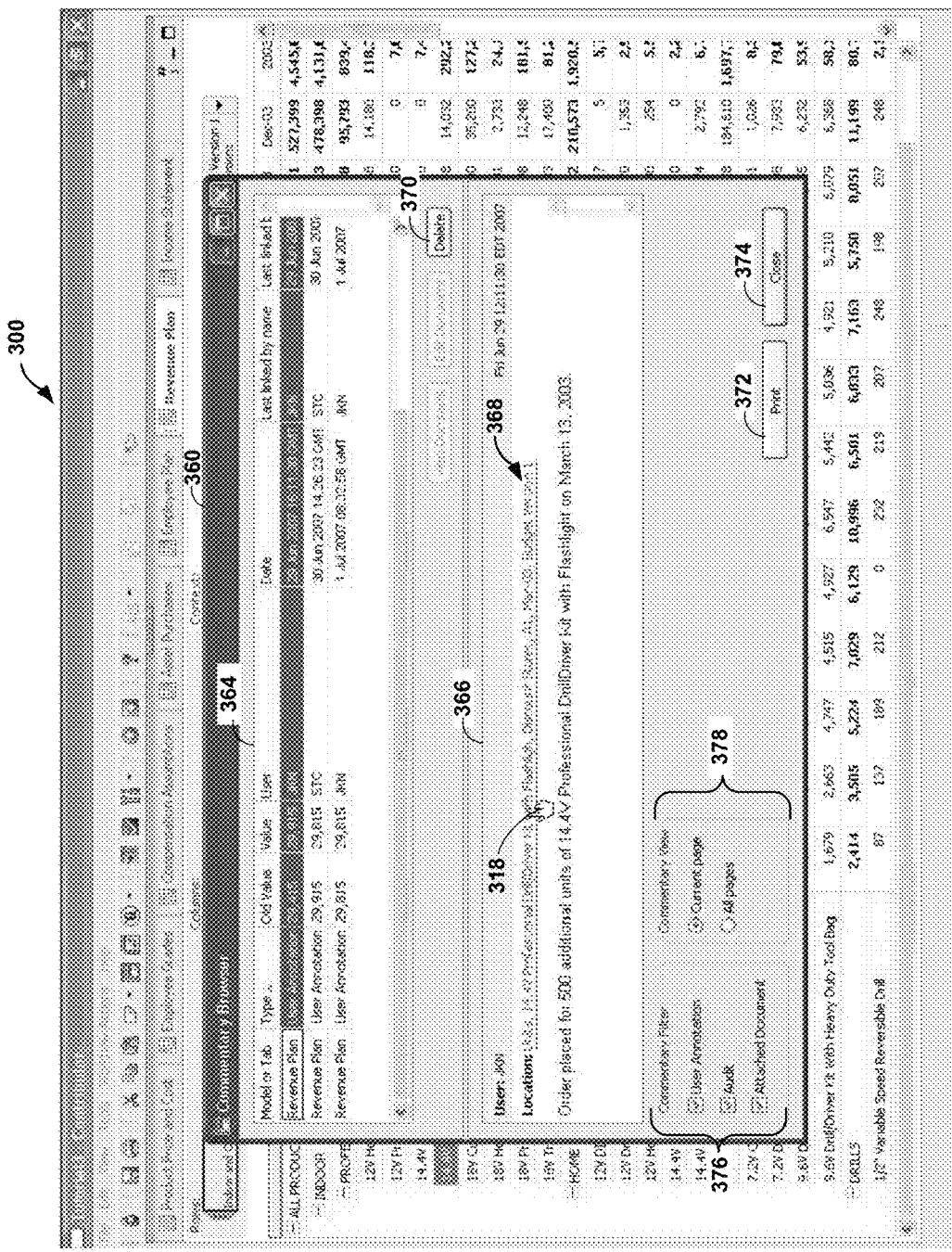
FIG. 11 is an example screen illustration of user interface upon which a commentary browser window is superimposed.

User interface 20 may call commentary browser 36 to present a list of annotations to user 12A. For example, commentary browser 36 may present a list of one or more annotations in a commentary browser window, as shown in the example of FIG. 11. Commentary browser 36 may furthermore display a link associated with an annotation, such that when user 12A clicks the link, user interface 20 will present the sheet to which the annotation was relevant, highlight the cell for which the annotation is relevant, and/or display the annotation. The link may be a link to the context in which the annotation was originally entered. Continuing the above example, commentary browser 36 may present a list of annotations to user 12A, including in the list an entry for cell C[5], E[13]. When user 12A selects the annotation associated with cell C[5], E[13], commentary browser 36 may display a link to {A[3], B[2], D[7], C×E}. When user 12A selects the link, commentary browser 36 may display the sheet defined by {A[3], B[2], D[7], C×E} and depict a flag or other indication of an annotation in cell C[5], E[13].

Commentary browser 36 and/or user interface 20 may further enable deletion of one or more of the annotations. User 12A may accordingly request to delete one of the annotations. In response, planning application 25 may remove the deleted annotation from annotation tables 24. When all annotations for a particular cell are deleted, user interface 20 may remove the flag that indicated the presence of an annotation from the display of the cell.

Enterprise system 14 may automatically aggregate the contribution data across enterprise 4 in real-time, and may provide access to the aggregated data to reviewers associated with higher levels of the enterprise. This process continues until the contribution data is ultimately approved by the reviewers associated with the highest level of the organizational hierarchy, thereby ensuring that the contribution data from the contributors reconciles with corporate targets.

In one embodiment, annotations may also be aggregated during data aggregation. For example, distinct users, e.g. users 12A and 12B, may have annotated two distinct cells. During data aggregation, the two cells may become aggregated into one cell. The data for the two cells may be combined mathematically or by some other means. Annotation table 24 may likewise aggregate the annotations. That is, the annotations for each cell may be joined to form a single list of annotations. In one embodiment, user interface 20 may present a single list of annotations for such an aggregated cell. In other embodiments, user interface 20 may differentiate the annotations relevant to each particular cell. For example, user interface 20 may present multiple lists of annotations, annotations differentiated by color wherein user interface 20 selects a distinct color for each of the cells being aggregated, or by other means.

In one embodiment, calculation engine 22 and data cubes 32 are loaded for use during the enterprise planning session. Calculation engine 22 may, for example, comprise a forward calculation engine 22 wrapped in an Active X object built in an array-based language. In other embodiments, calculation engine 22 may be implemented by creating layered function datasets within object store 30. Calculation engine 22 may generally perform operations, such as mathematical operations, on cells of data cubes 32.

Figure 3:
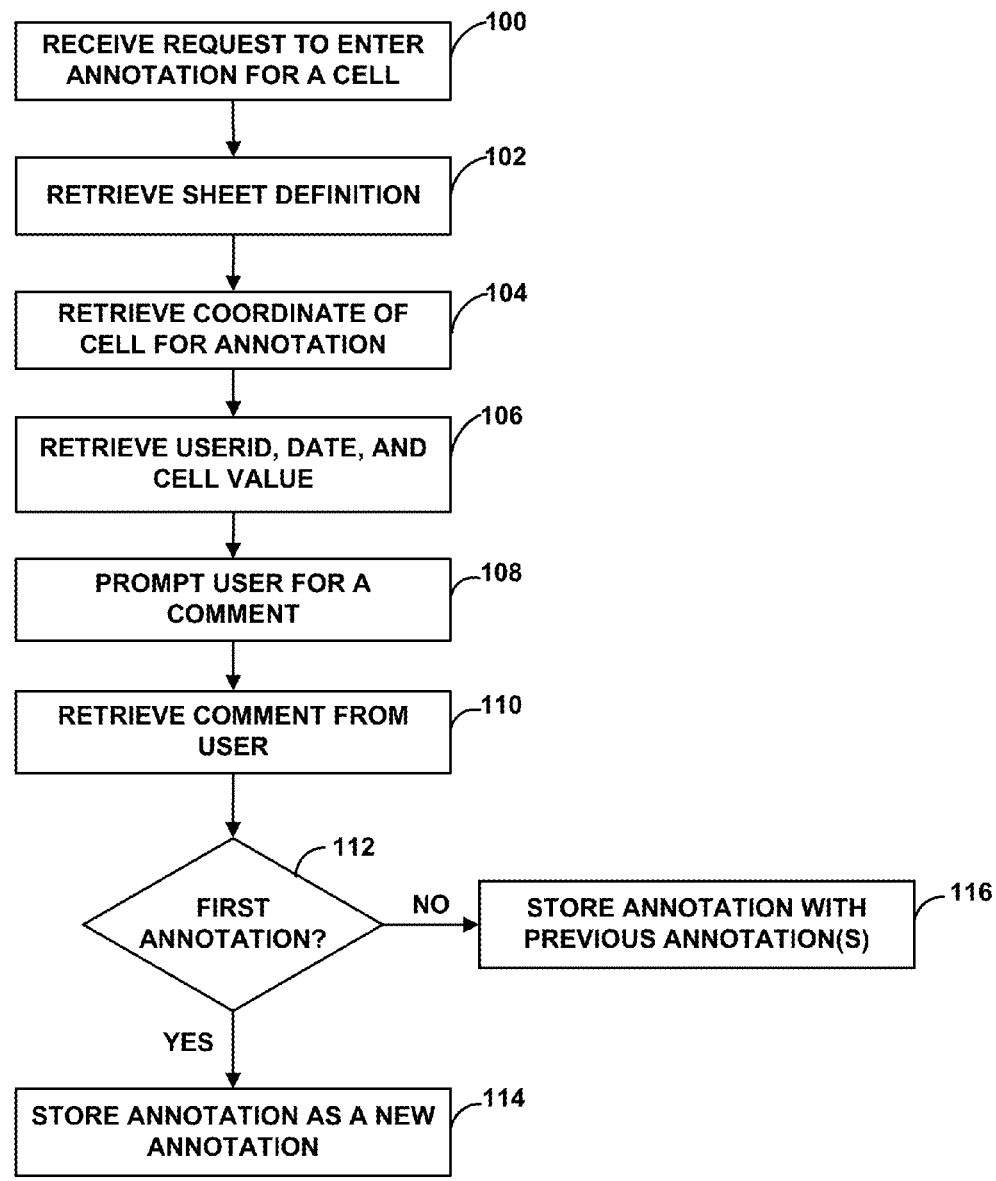
FIG. 3 is a flowchart illustrating an example process for entering an annotation.

FIG. 3 is a flow chart illustrating an example process for entering an annotation. The example of FIG. 3 is directed to entering an annotation for a specific cell of a sheet, however a similar process may be used for entering annotations for higher-ordered objects, such as sheets and data cubes. As discussed with respect to FIG. 2, user interface 20 may present an option to a user, for example, user 12A, to enter an annotation. When user 12A selects this option, user interface 20 may receive the request to enter an annotation and call annotation interface (IF) module 38 (100).

In response, annotation IF module 38 may direct planning application 25 to retrieve the definition of the sheet in which user 12A is entering the annotation (102). A sheet may be defined by context, e.g. selected rows and columns and single-value dimensions. Rows may be all entries in one dimension of a data cube, while a column may all entries in a different dimension of the data cube. The context may further include particular values of the remaining dimensions of the data cube. For example, data cube 32A may have five dimensions {A, B, C, D, E}, one sheet may be defined as {C, E, A[3], B[2], D[7]}. This exemplary sheet would be a cross tab display of rows C by columns E, wherein the data is selected for A[3], B[2], and D[7]. Planning application 25 would retrieve the sheet definition {C, E, A[3], B[2], D[7]}.

Planning application 25 may then retrieve the coordinates of a cell for which user 12A indicated a desire to enter an annotation (104). In continuing the above example, user 12A may have selected the cell C[5], E[13]. Accordingly, planning application 25 would retrieve C[5], E[13] as the coordinates of the cell.

Planning application 25 may also retrieve certain information for the annotation to identify the annotation, to distinguish the annotation from other annotations, or for other reasons. In the example portrayed in FIG. 3, planning application 25 retrieves a userID, the current date, which may be a date/time according to any suitable format, and a current cell value (106). Other embodiments may retrieve this or other information.

Annotation IF module 38 may then prompt user 12A for a comment (108). In one embodiment, for example, annotation IF module 38 may present a graphical text box, such as comment box 330 of FIG. 7, to user 12A. Annotation IF module 38 may display some or all of the information retrieved at (106) as part of the graphical text box, as in the example of FIG. 7. User 12A may then enter a comment and submit the comment, for example, by pressing an "OK" button also presented by annotation IF module 38. In response, annotation IF module 38 may retrieve the comment entered by user 12A.

Planning application 25 may then determine whether the annotation was the first annotation (112). For example, planning application 25 may examine annotation tables 24 to determine whether, for the selected data cube, an annotation exists in the selected cell of the selected data cube for the particular context. In continuing the above example, planning application 25 may examine annotation tables 24, e.g. annotation table 34A related to data cube 32A, to determine whether a comment exists for cell C[5], E[13] in the context of {C, E, A[3], B[2], D[7]} of data cube 32A. Notably, planning application 25 determines more than simply whether an annotation exists for the cell defined by {A[3], B[2], C[5], D[7], E[13]} of data cube 32A, because annotations are typically sensitive to the context in which they are entered. However, other embodiments may utilize other storage schemas wherein annotations are simply stored according to the coordinates of the cells to which the annotations relate.

When planning application 25 determines that the annotation is the first annotation for the selected cell in the given context ("YES" branch of 112), planning application 25 may store all of the details of the annotation (114). That is, planning application 25 may create a new entry in annotation tables 24, defined by the coordinates and the context of the cell for which user 12A entered the annotation. Planning application 25 may then store the details of the annotation, e.g. the userID, the date, the current value, and the user comment, in the new entry of annotation tables 24.

When planning application 25 determines that the annotation is not the first annotation for the selected cell in the given context ("NO" branch of 112), implicitly an annotation already exists for the selected cell in the given context. Accordingly, planning application 25 may store the details of the new annotation for the selected cell with the previous annotation (116). That is, a new entry is not necessarily needed in annotation tables 24 in order to store the new annotation.

In some embodiments, annotation tables 24 may store annotations in annotation tables 24 in an array indexed by the cell coordinates and context and an ordinal number according to the order in which the annotation for the cell was received. In other embodiments, annotation tables 24 may use a "date" field of an annotation to differentiate annotations for a particular cell in a particular context from each other. In any case, planning application 25 may enable users 12 to view each annotation for the cell individually or to view all of the annotations together. Moreover, planning application 25 may later receive a request to delete a particular annotation from the cell, therefore storing the annotations for a cell individually may enhance the efficiency of viewing and/or deleting individual annotations.

Figure 4:
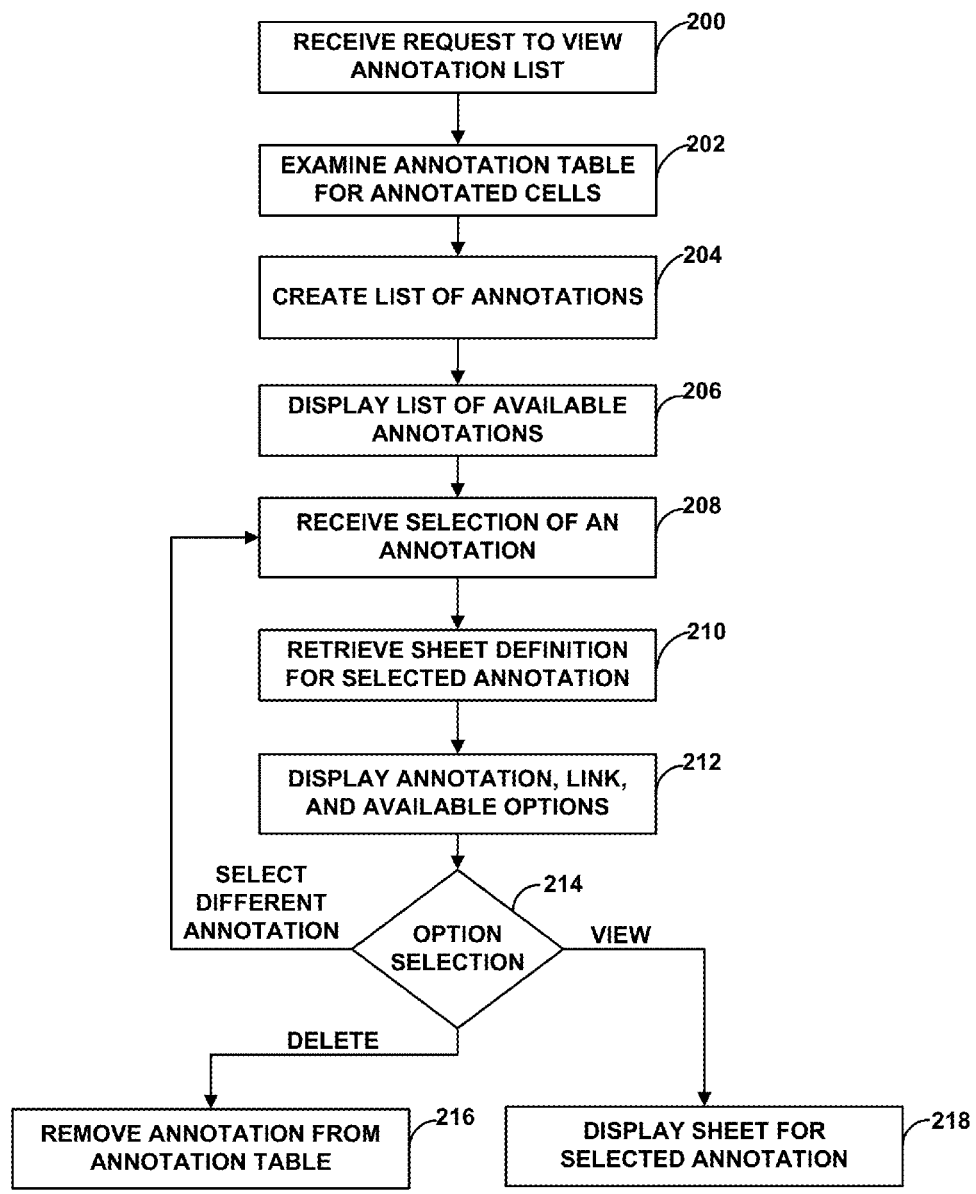
FIG. 4 is a flowchart illustrating an example process for displaying a list of annotations.

FIG. 4 is a flowchart illustrating an example process for displaying a list of annotations. User interface 20 may present a user, such as user 12A, with an option to view a list of annotations. When user 12A selects this option, user interface 20 may receive the request (200) and call commentary browser 36 in response. In general, commentary browser 36 may display a list of available annotations to user 12A, as well as provide the ability for user 12A to select an annotation and see the context in which the annotation was entered. Commentary browser 36 may further enable user 12A to apply one or more filters to the available annotations to aid user 12A in finding a particular annotation or annotations of particular interest. Commentary browser 36 may also allow user 12A to delete an annotation. Although not shown in the flowchart of FIG. 4, in one embodiment, user 12A may also select a "cancel" option at essentially any time during the process to end the process and close commentary browser 36.

Commentary browser 36 may first cause planning application 25 to examine annotation tables 24 to search for all available annotations (202). Commentary browser 36 may retrieve this information from planning application 25. Commentary browser 36 may also provide an interface by which user 12A may apply one or more filters, as described with respect to the example of FIG. 11.

Commentary browser 36 may create a list of all available annotations (204). Commentary browser 36 may display the list of available annotations (206), for example, as depicted in FIG. 11. When user 12A requests one or more filters, commentary browser 36 may apply the selected filters and display only those annotations satisfying the filtering criteria. For example, user 12A may request to see annotations with files attached; commentary browser 36 may determine which annotations from the full list have files attached and display only those annotations accordingly.

User 12A may request to view a particular annotation from the list of displayed annotations. In one embodiment, for example, user 12A may control a pointer with a mouse attached to computing device 16A. User 12A may select a particular annotation from the list of annotations by pointing to the annotation and pressing a button on computing device 16A, such as a left mouse button. Commentary browser 36 may then receive the request to view the selected annotation (208). In continuing the above example, user 12A may request to view an annotation corresponding to cell C[5], E[13]. Commentary browser 36 may retrieve the sheet definition, i.e. the context, corresponding to the annotation from planning application 25 (210). That is, for the above example, commentary browser 36 may retrieve the context definition {C, E, A[3], B[2], D[7]} from planning application 25.

Commentary browser 36 may then display the annotation and a variety of options (212). In one embodiment, for example, commentary browser 36 may display the annotation in a separate text box from that of a text box for displaying the list of annotations. Commentary browser 36 may generate a link to the context, e.g. the sheet, according to the retrieved context definition. For the above example, commentary browser 36 may display a link to the sheet corresponding to {C, E, A[3], B[2], D[7]}. Commentary browser 36 may also display an option to user 12A to delete the annotation. Commentary browser 36 will then wait for user 12A to select an option (214). User 12A may select a different annotation, in which case commentary browser 36 will receive the newly selected annotation (208), retrieve the sheet definition (210) to create a link corresponding to the newly selected annotation, and display the annotation, link, and available options (212).

When user 12A requests to delete an annotation ("DELETE" branch of 214), commentary browser 36 may instruct planning application 25 to delete the annotation from annotation tables 24. Planning application 25 may accordingly remove the annotation from annotation tables 24 (216). For example, if the annotation was for a cell of data cube 32A, planning application 25 may delete the selected annotation identified by the context and the selected coordinates in annotation table 24A. In the case that the deleted annotation was one of a plurality of annotations for the same cell in the same context, planning application 25 will only delete the selected annotation, not the entire list of annotations for that cell. Accordingly, planning application 25 may need to rearrange the annotations stored in annotation tables 24. For example, if annotation tables 24 store annotations in an array data structure, planning application 25 may move subsequent entries in the array forward by one unit. As another example, if annotation tables 24 store annotations as a linked list data structure, planning application 25 may rearrange one or more pointers of the linked list. For other data structures, planning application 25 may act accordingly. Commentary browser 36 may also remove the deleted annotation from the displayed annotation list.

When user 12A requests to view the sheet, ("VIEW" branch of 214), commentary browser 36 may instruct user interface 20 to display the sheet in which the annotation was entered. User interface 20 may use the context definition to recreate and display the sheet (218). In one embodiment, user 12A may click the link to the sheet by controlling a pointer with a mouse attached to computing device 16A to request to view the sheet. In some embodiments, commentary browser 36 may close after user 12A requests to view the annotation. In any case, user interface 20 may display the sheet corresponding to the annotation. In some embodiments, user interface 20 may highlight the cell corresponding to the annotation, for example, by displaying a box around the corresponding cell. In the above example, user interface 20 may display the sheet {C, E, A[3], B[2], D[7]} by retrieving values for A[3], B[2], and D[7] from planning application 25 and displaying the data for the dimension C in rows and the dimension E in columns. User interface 20 may also highlight cell C[5], E[13]. In some embodiments, user interface 20 may further display the annotation, for example, as a tooltip next to the annotated cell, although other embodiments may display the annotation with other suitable means. As another example, another embodiment may display the annotation in a distinct window. Yet another embodiment may display the annotation in a separate frame or toolbar of the same window.

Figure 5:
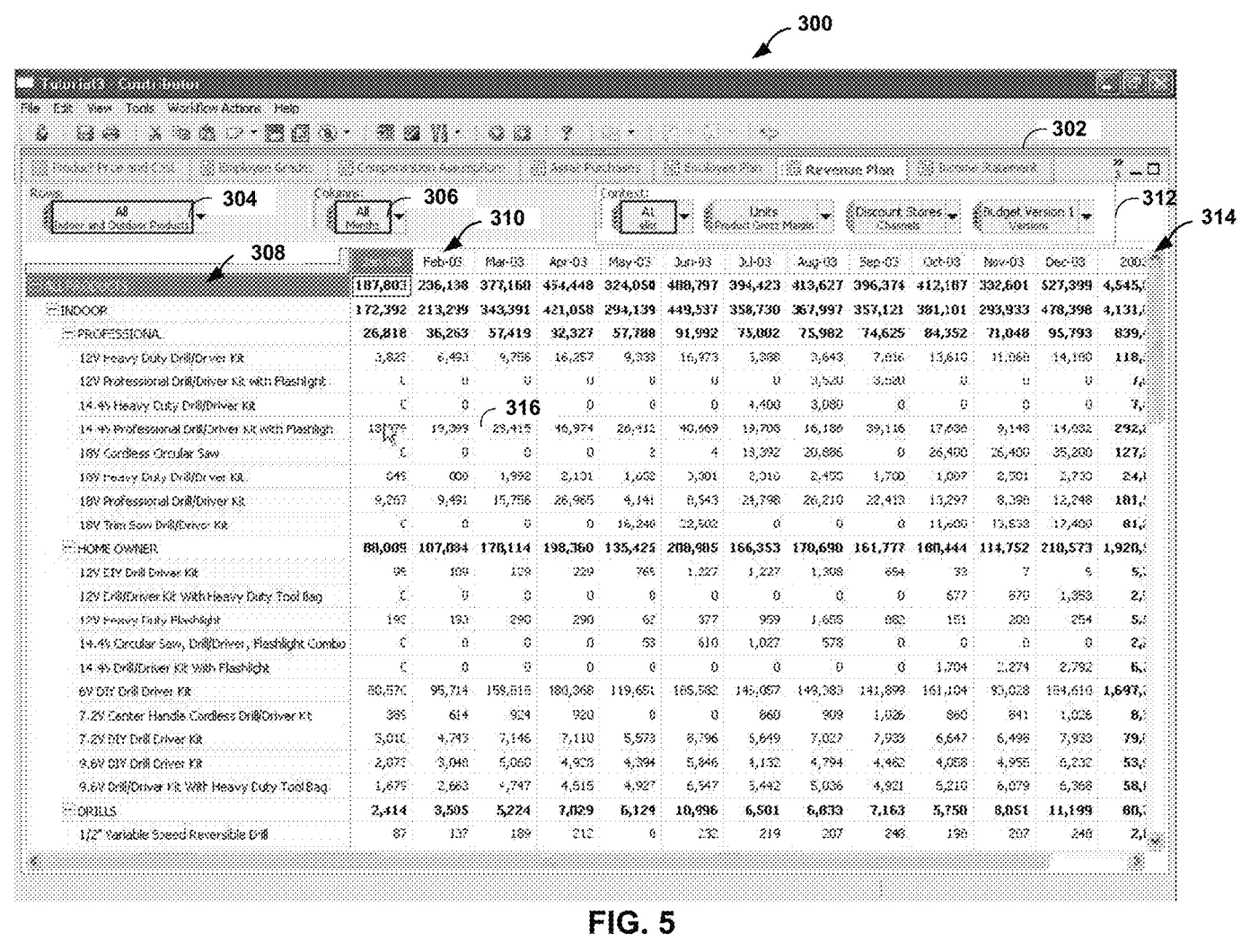

FIG. 5 is a screen illustration of a user interface 300 for viewing and entering planning data. User interface 300 is an example embodiment of user interface 20 of FIG. 2. User interface 300 presents an exemplary sheet view of data from data cubes 32. As discussed above, when one of users 12 (e.g., user 12A) needs to enter or view, for example, planning data, user 12A may cause computing device 16A to execute planning application 25. When planning application 25 executes, planning application 25 downloads a slice of planning data from enterprise system 14 and stores the planning data in one or more of data cubes 32. This disclosure refers to this downloaded slice as user planning data. After planning application 25 stores user planning data, planning application 25 may cause computing device 16A to display user interface 300. User 12A may request that user interface 300 display particular data from data cubes 32, as described in greater detail below.

User interface 300 presents user planning data in a manner that may be readily understood by a human user. For instance, user interface 300 includes tabs 302 for each data cube in user planning data stored in data cubes 32. Tabs 302 indicate a "Product Price and Cost" data cube, an "Employee Grades" data cube, a "Compensation Assumptions" data cube, an "Asset Purchases" data cube, an "Employee Plan" data cube, a "Revenue Plan" data cube, and an "Income Statement" data cube.

In order to view and/or edit data in a data cube of user planning data, user 12A may use a mouse or other pointing device to click on the one of tabs 302 that indicates the data cube. In the example of FIG. 5, user 12A has clicked on the tab that indicates the "Revenue Plan" data cube. When user 12A clicks on one of tabs 302, planning application 25 may cause user interface 300 to include a row selection box 304, a column selection box 306, and a set of context selection boxes 312. User 12A may use row selection box 304 to select items of a dimension of the selected data cube to serve as the vertical axis of a table 314 that presents data in the selected data cube. In the example of FIG. 5, user 12A has used row selection box 304 to select all items of an "Indoor and Outdoor Products" dimension of the "Revenue Plan" data cube. Similarly, user 12A may use column selection box 306 to select items of a dimension of the selected data cube to serve as a horizontal axis of table 314. In the example of FIG. 5, user 12A has used column selection box 306 to select all items of a "Months" dimension of the "Revenue Plan" data cube.

User 12A may then use context selection boxes 312 to select one item in each of the other dimensions of the selected data cube. In the example of FIG. 5, the "Revenue Plan" data cube includes an "elist" dimension, a "Product Gross Margin" dimension, a "Channels" dimension, and a "Versions" dimension. Furthermore, in the example of FIG. 5, user 12A has selected the "A1" item for the "elist" dimension, the "Units" item for the "Product Gross Margin" dimension, "Discount Stores" item for the "Channels" dimension, and "Budget Version 1" item for the "Versions" dimension. In this way, user 12A specifies a two-dimensional sheet of the data in the selected data cube.

After user 12A uses row selection box 304, column selection box 306, and context selection boxes 312 to specify a two-dimensional sheet of the data in the selected data cube, user interface 300 presents the specified two-dimensional sheet of the data in the selected data cube as table 314, for example, in a cross tab display as shown in FIG. 5. Each individual cell in table 314 contains data of a cell of the selected data cube that is indicated by an item in the selected row dimension of the selected data cube, an item in the selected column dimension of the selected data cube, and selected items in the context dimensions. For example, cell 316, in the "14.4V Professional Drill/Driver Kit with Flashlight" row and in the "March-3" column of table 314, contains value "29,415" corresponding to data of a cell in the "Revenue Plan" data cube that is located at the "14.4V Professional Drill/Driver Kit with Flashlight" item in the "Indoor and Outdoor Products" dimension, the "March-3" item in the "Months" dimension, the "A1" item in the "elist" dimension, the "Units" item in the "Gross Product Margin" dimension, the "Discount Stores" item in the "Channels" dimension, and the "Budget version 1" item in the "Versions" dimension.

Figure 6:
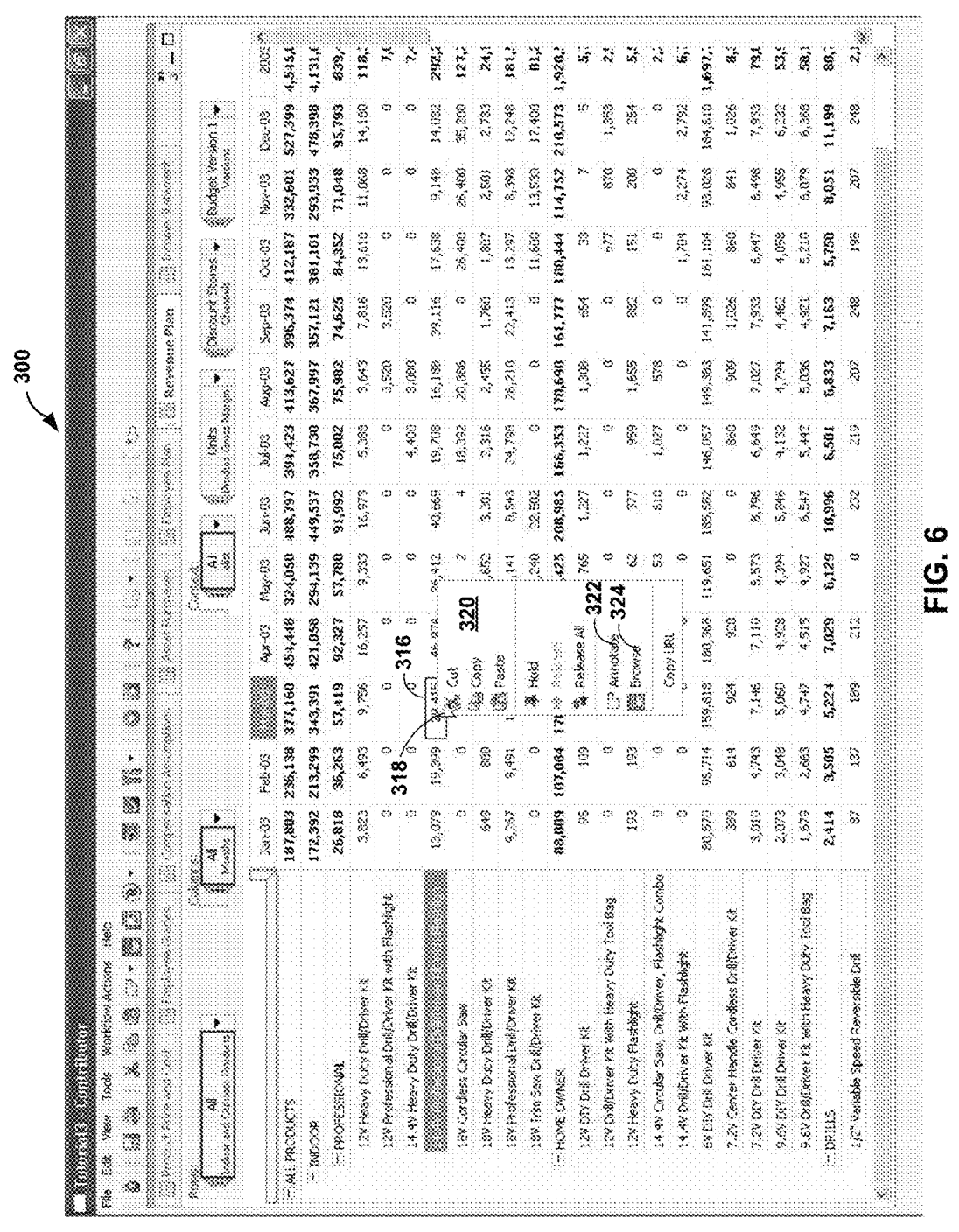

FIG. 6 is an example screen illustration of a user interface 300 for requesting to enter an annotation. User 12A may add annotations to cells in table 314 or to other higher-level objects such as sheets or data cubes. An annotation may be text-based commentary or other descriptive data that user 12A inputs in order to provide additional information about a particular cell. User 12A may also attach a file to the annotated cell, as described in greater detail below. That is, an annotation of a cell or other data object may include attaching a file of any sort to the cell or data object in addition to, or in lieu of, text-based commentary. In one embodiment, annotation IF module 38 may automatically enter certain descriptive data about an annotated cell in the annotation. In order to add an annotation to a cell in table 314, such as cell 316, user 12A may use a mouse or other input device to position a cursor 318 over cell 316 in table 314. When user 12A positions cursor 318 over a cell in table 314, user 12A may press a button on computing device 16A in order to cause user interface 300 to display a cell options menu 320. For instance, user 12A may press the right mouse button in order to cause user interface 300 to display cell options menu 320 for cell 316, as depicted in FIG. 6. Cell options menu 320 includes an annotate option 322. If user 12A selects annotate option 322, user interface 300 may cease to display cell options menu 320, but may instead display an annotation entry window that user 12A may use to add an annotation to the cell. An exemplary embodiment of an annotation entry window is illustrated in the example of FIG. 7.

Although not illustrated in the example of FIG. 6, user 12A may also position cursor 318 over one of tabs 302. After user 12A positions cursor 318 over one of tabs 302, user 12A may press a button on computing device 16A in order to cause user interface 300 to display a data cube options menu. This data cube options menu may also include an annotate option. If user 12A selects this annotate option, user interface 300 may display an annotation entry window similar to that which user 12A may use to add an annotation to a cell. User 12A may then use this annotation entry window to add an annotation to the data cube or to some other object. Likewise, user 12A may position cursor 318 over a separate portion of user interface 300 and press a button on computing device 16A in order to cause user interface 300 to display a sheet options menu, whereby user 12A may select an annotate option to enter an annotation with respect to the currently displayed sheet. In alternative embodiments, other option selection means may be used without departing from the principles of the techniques described herein. For example, in one embodiment, user 12A may select the "Tools" drop-down menu from the standard toolbar at the top of user interface 300. The "Tools" drop-down menu may include an annotate option that user 12A may select to annotate a cell, a sheet, a cube, or other data object.

Figure 7:
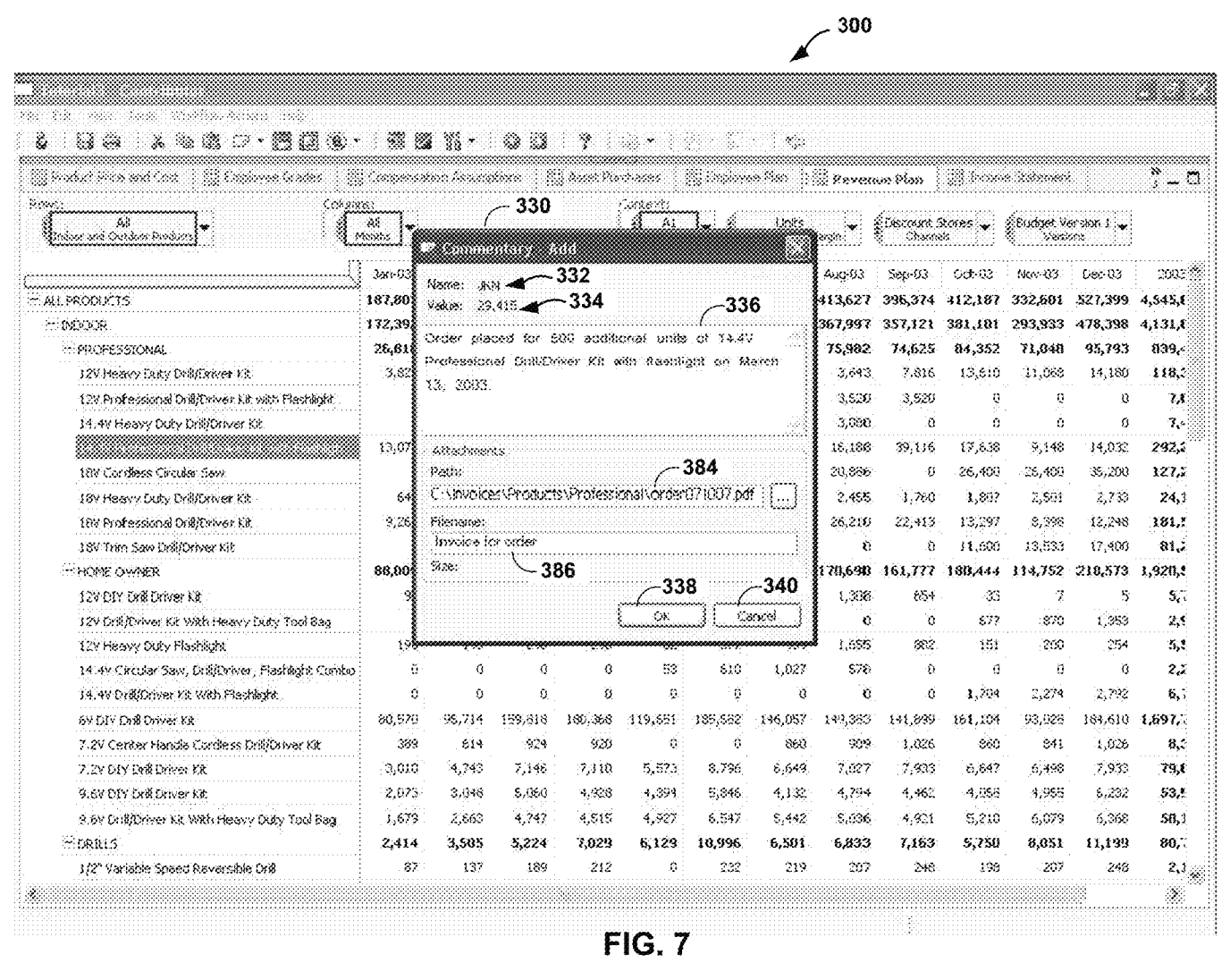

FIG. 7 is a screen illustration of user interface 300 upon which an annotation entry window 330 is superimposed. User interface 300 may present annotation entry window 330 when user 12A selects annotation option 322 in order to add an annotation to a cell. Annotation entry window 330 includes comment box 336. User 12A may enter text into comment box 336 in order to provide additional information about a selected cell in table 314. In the example of FIG. 7, user 12A has entered the text "Order placed for 500 additional units of 14.4V Professional Drill/Driver Kit with flashlight on Mar. 13, 2003." This comment might be useful to another one of users 12 who may see the cell in table 314 and wonder why the data in the cell is 500 units higher than when the user previously saw table 314. Annotation entry window 330 may also include an indication 332 of the name or user identification of the current user. Moreover, when entering an annotation for a specific cell, annotation entry window 330 may include an indication 334 of the current value of the cell. When entering an annotation for a higher-order object, such as a sheet, annotation entry window 330 may omit current value indicator 334 or may display "N/A" as the value.

Annotation entry window 330 also includes a set of input boxes that allow user 12A to attach one or more files to an annotation for a cell in table 314. For instance, user 12A may attach a file present on a local hard disk of computing device 16A by entering a path to the file in a path field 384. User 12A may also attach files present on other storage devices, such as network drives. In the example of FIG. 7, user 12A has entered the path "C:\Invoices\Products\Professional\order071007.pdf" into path field 384. This attached file may contain an invoice for the order for 500 drill/driver kits alluded to in comments box 336. A filename box 386 in annotation entry window 330 allows user 12A to enter a user-friendly name for the file attached to the annotation. In the example of FIG. 7, user 12A has entered the name "Invoice for order" in filename box 386. When a subsequent user requests to view the annotation of a cell that has an attached file, planning application 25 may permit the user to view the attached file. Planning application 25 may retrieve the attached file and display the file to the user. In continuing the above example, user 12B may request to view the file attached to cell 316. Accordingly, planning application 25 may retrieve the file "order071007.pdf" from location "C:\Invoices\Products\Professional." Planning application 25 may also display this file to user 12B. In general, user 12A may attach any sort of file to an annotated object.

When user 12A selects an "OK" button 338 of annotation entry window 330, planning application 25 automatically adds the annotation to the cell. Planning application 25 may store the annotation in annotation table 24. In addition, planning application 25 may upload and store any files specified in path field 384. Alternatively, user 12A may select "Cancel" box 340 of annotation entry window 330 to cancel the entry of the annotation, in which case planning application 25 will not save a new annotation and annotation entry window 330 will close.

Figure 8:
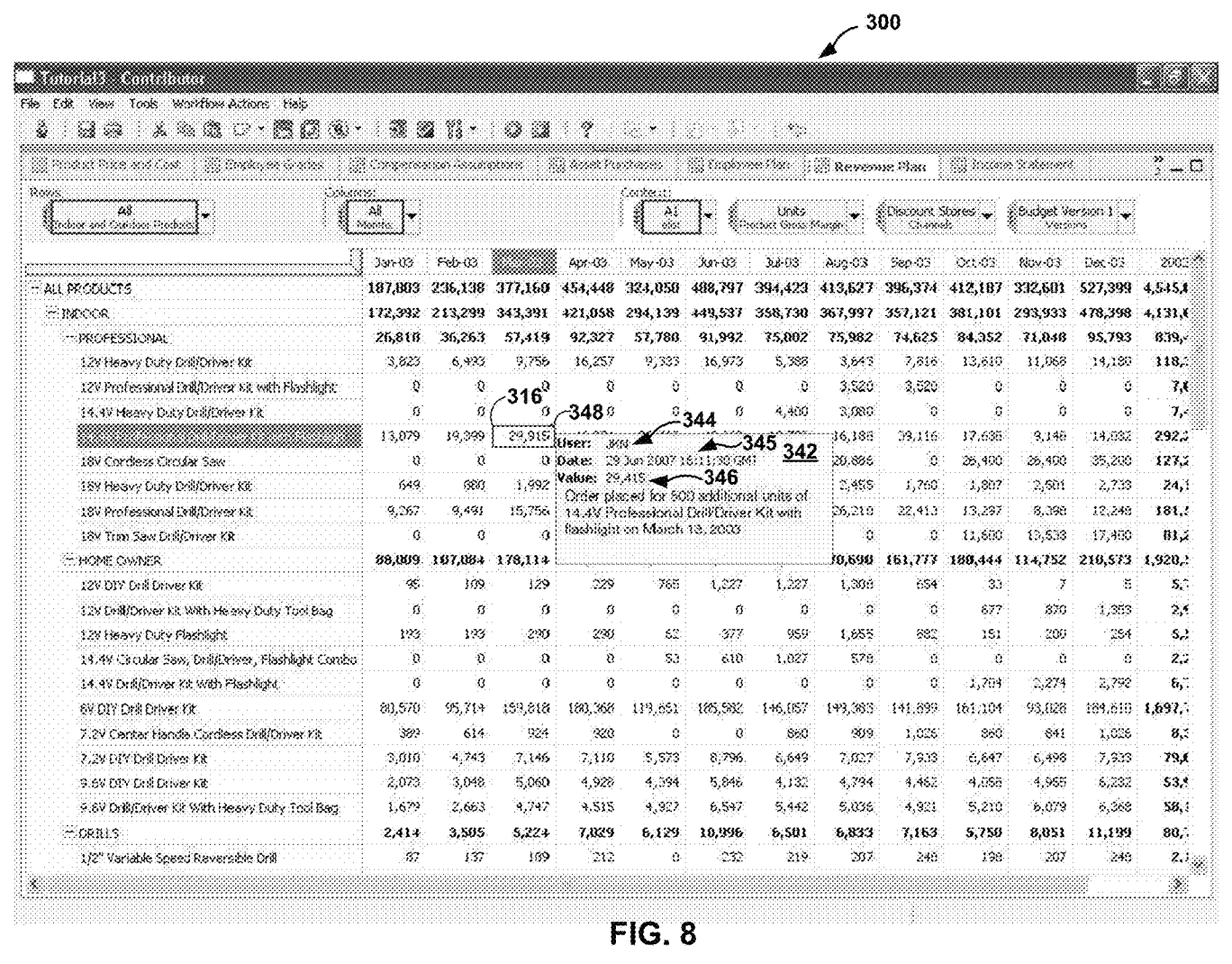

FIG. 8 is a screen illustration of user interface 300 displaying an annotation viewing window 342, herein referred to as a "tooltip," for cell 316 of planning data in table 314. After user 12A has added an annotation to cell 316 in table 314, user 12A or other ones of users 12 may view this annotation. User interface 300 may indicate the presence of an indication in a cell. In the example of FIG. 8, user interface 300 has included a graphical flag 348 in cell 316 to indicate the presence of an annotation in cell 316. User 12A may view the annotation by positioning cursor 318 over a cell in table 314 that has an annotation, such as cell 316. When user 12A positions cursor 318 over a cell in table 314 that has an annotation, user interface 300 may automatically display tooltip 342. Although the exemplary embodiment described with respect to FIG. 8 uses a tooltip to perform the functions of annotation viewing window 342, it should be appreciated that other means of displaying an annotation may also be used in other embodiments. For example, in another embodiment, annotation viewing window 342 may be a new window or a new toolbar within the same window.

In the example of FIG. 8, tooltip 342 includes the text "Order placed for 500 additional units of 14.4V Professional Drill/Driver Kit with flashlight on Mar. 13, 2003." Note that this text is the same as the text entered in comment box 336. Likewise, tooltip 342 includes user identifier 344 that corresponds to user indication 332 of annotation entry window 330 and value identifier 346 that corresponds to value indication 334 of annotation entry window 330. Tooltip 342 may also include date identifier 345 that may include an indication of when (i.e., the date and/or the time) at which the annotation was entered. Various embodiments may display the date/time in various formats.

User 12A may edit entries of table 314. For example, as shown in FIG. 8, user 12A has changed the value of cell 316 from "29,415" to "29,915." Users 12 may use the annotation feature of user interface 300 to track changes to the cells of table 314, although no change in the values is necessary in order to enter annotations. In one embodiment, user interface 300 may present an auditing option to users 12 wherein, when the auditing option is selected, planning application 25 automatically records an annotation upon all changes to the data. Likewise, user 12A can disable the auditing option and planning application 25 will accordingly stop automatically recording annotations for changes to the data.

Figure 9:
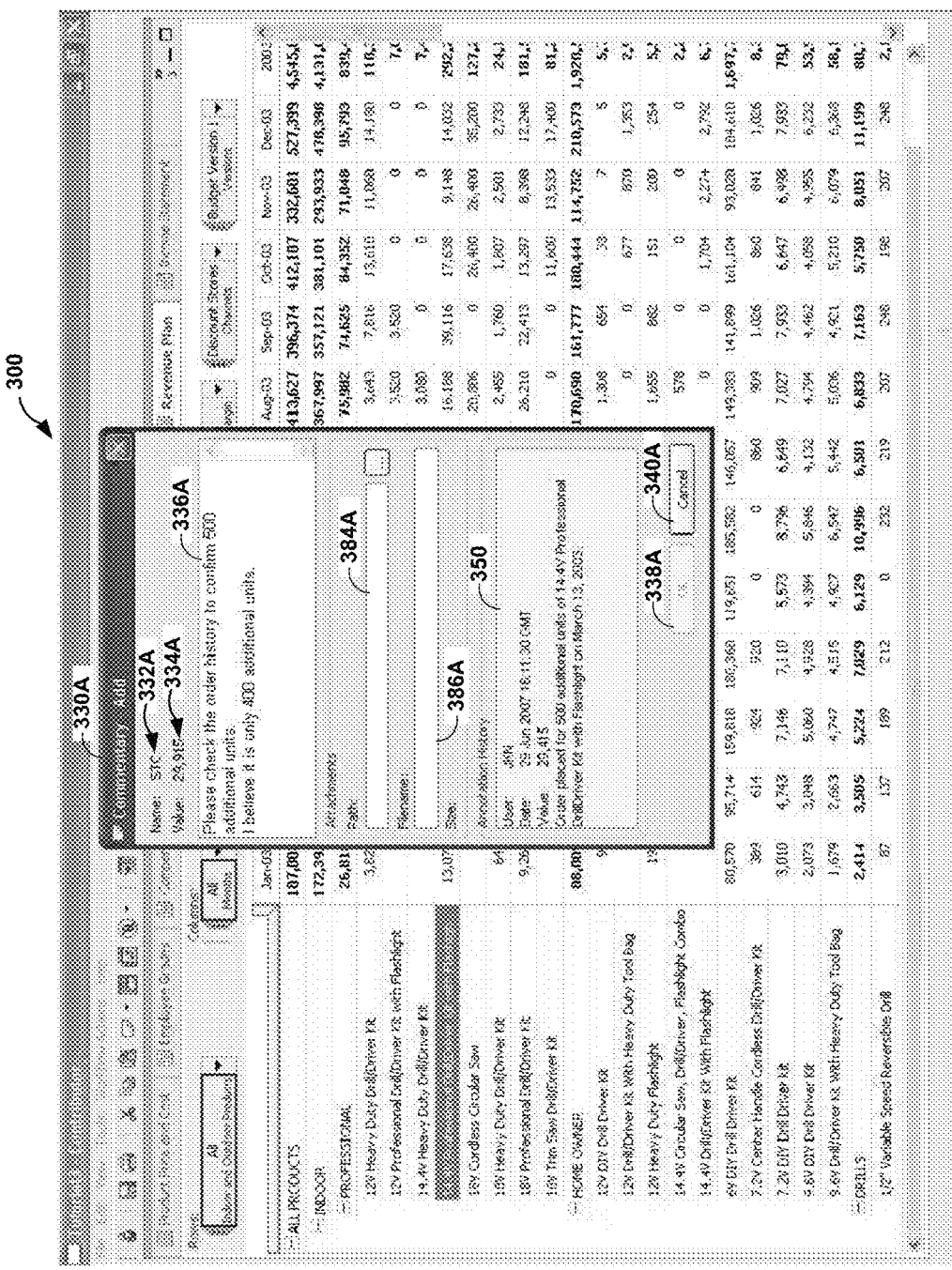
FIG. 9 is an example screen illustration of a user interface upon which a subsequent annotation entry window is superimposed.

FIG. 9 is a screen illustration of user interface 300 upon which a subsequent annotation entry window 330A is superimposed. One of users 12 may enter an additional comment to a cell, such as cell 316, for which a comment already exists. The user entering the additional comment may be the same user or a different user than the user who originally entered the annotation. For example, user 12A may enter a first comment, and user 12A may enter a subsequent comment to correct the value of cell 316 and inform other users 12 of the change, or to answer questions from other users 12. As another example, a different user, such as user 12B, may enter an annotation to cell 316 for which an annotation already exists.

In the example of FIG. 9, user 12A has already entered a comment for cell 316 and user 12B has requested to enter an additional comment. User interface 300 presents an annotation entry window 330A that is very similar to annotation entry window 330. For example, annotation entry window 330A includes user identifier 332A, value identifier 334A, comment box 336A, path field 384A, and filename box 386A, each of which may perform substantially similar functions to their respective counterparts in annotation entry window 330. In addition, annotation entry window 330A presents annotation history box 350 that presents previously entered annotations. In the example of FIG. 9, annotation history box 350 presents the annotation previously entered by user 12A. In one embodiment, when the text for annotation history box 350 exceeds the size of box 350, user interface 300 may include scroll buttons on the side annotation history box 350 (not shown) in order for user 12B to view the entire annotation history.

When user 12B enters a comment in comment box 336A and selects "OK" button 338A, planning application 25 will save the new annotation along with previous annotations in annotation table 24. In the example of FIG. 9, user 12B has entered the comment, "Please check the order history to confirm 500 additional units. I believe it is only 400 additional units."

Figure 10:
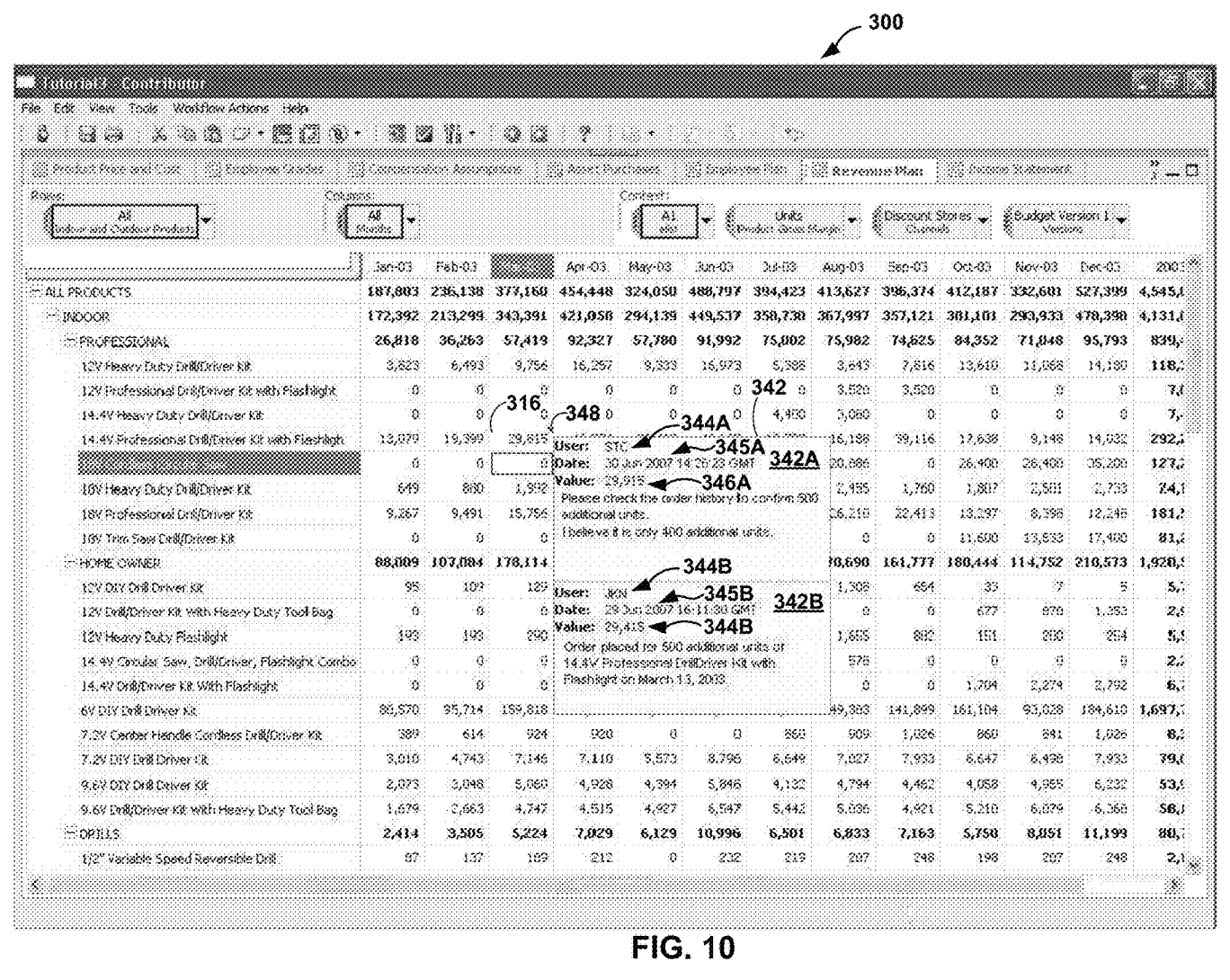

FIG. 10 is a screen illustration of user interface 300 displaying tooltip 342 that includes multiple annotations 342A and 342B for cell 316 of planning data in table 314. As in FIG. 8, user interface 300 includes a graphical flag 348 in cell 316 to indicate the presence of a comment in cell 316. In some embodiments, user interface 300 may indicate the presence of multiple comments in a cell in a manner that is distinct from the manner in which user interface 300 indicates the presence of a single comment. In the example embodiment of FIG. 10, however, user interface 300 uses the same graphical flag 348 to indicate the presence of one or more comments in a cell. In the example of FIG. 10, user 12B has also changed the value of cell 316 from "29,915" to "29,815."

When a user, such as user 12A, positions cursor 318 over a cell in table 314 that has an annotation, user interface 300 may automatically display tooltip 342. For a cell that includes multiple comments, tooltip 342 may include multiple partitions, e.g. window 342A and 342B. In the example of FIG. 10, window 342A includes user identifier 344A that corresponds to user indication 332A of annotation entry window 330A and value identifier 346A that corresponds to value indication 334A of annotation entry window 330A. Window 342B includes user identifier 344B that corresponds to user indication 332 of annotation entry window 330 and value identifier 346B that corresponds to value indication 334 of annotation entry window 330. Moreover, windows 342A, 342B include respective date fields 345A, 345B that indicate the respective dates and times at which the respective annotations were entered.

FIG. 11 is a screen illustration of user interface 300 upon which a commentary browser 360 is superimposed. Commentary browser 360 enables users 12, such as user 12A, to view all annotations in annotation table 24 related to downloaded data cubes 32. User 12A may see comments relevant to any sheet of any datacube. In the example of FIG. 11, commentary browser 360 includes comment list 364, comment box 366, "Delete" button 370, "Print" button 372, and "Close" button 374. User 12A may open the commentary browser window by, e.g., positioning cursor 318 over a "browse" option and pressing a button on computing device 16A, such as a left mouse button. The example of FIG. 6 depicts browse button 324 as part of option menu 320. Other embodiments may include other means for opening commentary browser 360, e.g., by including a "browse" option in the drop-down menu from the "Tools" option of the standard toolbar menu.

Comment list 364 displays a list of annotations available to user 12A. User 12A may narrow the list of annotations using commentary filter 376 and commentary view 378. Commentary filter 376 may include a variety of filtering options for user 12A. In the example of FIG. 11, commentary filter 376 presents three check-boxes, "User Annotation," "Audit," and "Attached Document." When the boxes are checked, annotations satisfying the respective filtering criteria are displayed. For example, if user 12A checks the "Attached Document" filter, only annotations that include an attached document will be displayed. In other embodiments, other filtering criteria may be presented. For example, in another embodiment, commentary filter 376 may present a text box to users 12 as well as a "Search By" drop-down menu (not shown); user 12A may select "User Name" from the "Search By" drop-down menu and type in the user name "STC" to view only annotations from user "STC." Those skilled in the art will appreciate that other types of searches and filtering functions may be presented.

User 12A may also narrow the list of annotations using commentary view 378. In the example of FIG. 11, commentary view 378 displays two radio buttons that allow user 12A to view either all available annotations (i.e., "All Pages") or only annotations regarding the current sheet (i.e., "Current Page"). Other embodiments may present other options as well. For example, an alternative embodiment may present radio buttons that allow user 12A to view all annotations relevant to specific dimensions or specific data cubes.

User 12A may select an annotation from annotation list 364. Commentary browser 360 may illustrate the selected annotation by highlighting the selected annotation, as shown in FIG. 11. Once user 12A has selected an annotation, commentary browser 360 may display the values of the annotation in comment box 366. For example, comment box 366 may display the user identification of the user who entered the annotation, the date the annotation was entered, and the comment associated with the annotation. Moreover, comment box 366 may include a link 368 to the sheet for which the comment was entered. Link 368 enables user 12A to quickly and easily retrieve the context in which the annotation was entered. That is, user 12A may select link 368 by positioning cursor 318 over link 368 and pushing a button on computing device 16A, such as a left mouse button. Upon selecting link 368, user interface 300 may present the sheet in which the annotation was entered to user 12A.

User 12A may also perform other functions with commentary browser 360. For example, user 12A may delete an annotation using "Delete" button 370. Once user 12A has selected an annotation from annotation list 364, user 12A may select "Delete" button 370 by, for example, positioning cursor 318 over "Delete" button 370 and pushing a button on computing device 16A, such as a left mouse button. In response to a user selecting "Delete" button 370, planning application 25 may remove the selected annotation from annotation tables 24. When planning application 25 connects to enterprise system 14, planning application 25 may upload updated annotation tables 24 that do not include the deleted annotation, therefore the deleted annotation will no longer be present either on computing device 16A or anywhere in enterprise system 14.

In a similar fashion, user 12A may print one or more annotations from annotation list 364 by selecting one or more annotations from annotation list 364 and selecting "Print" button 372. Computing device 16A may transmit data to a printing device (not shown) in response to user 12A selecting "Print" button 372, wherein the data sent to the printing device may include instructions to print the selected annotation(s). Likewise, user 12A may select "Close" button 374 to close commentary browser 360 and to return to the sheet view of user interface 300.

Various embodiments of the invention have been described. These and other embodiments are within the scope of the following claims.

The invention claimed is:

1. A method comprising:
retrieving, by one or more processors of a computing system, contribution data from an enterprise system, wherein the contribution data is arranged in N dimensions in a multidimensional database, and wherein N is greater than two;
retrieving, by the one or more processors, a first annotation for an object of the contribution data from the enterprise system, wherein the first annotation for the object was previously entered prior to retrieving the first annotation;

retrieving, by the one or more processors, a context definition defining a context in which the first annotation was previously entered prior to retrieving the first annotation, wherein the context corresponds to a particular cell of a sheet representative of the contribution data in the multidimensional database, the sheet comprising a two-dimensional cross-section of the multidimensional database characterized by full versions of two of the N dimensions and single values for each of the remaining N dimensions;

generating, by the one or more processors, a link to the context defined by the context definition and corresponding to the particular cell of the sheet representative of the contribution data in the multidimensional database;

outputting, by the one or more processors, the link in a graphical user interface; and displaying the first annotation in the graphical user interface when the link is selected.

2. The method of claim 1, further comprising outputting the sheet in accordance with the context definition when the link is selected.

3. The method of claim 1, further comprising storing the first annotation in an annotation table.

4. A computing device comprising:
a user interface to receive contribution data of an enterprise and to display a sheet of the contribution data, wherein the contribution data is arranged in N dimensions in a multidimensional database, wherein N is greater than two, and wherein the sheet comprises a two-dimensional cross-section of the multidimensional database characterized by full versions of two of the N dimensions and single values for each of the remaining N dimensions;

an annotation interface module to receive a first annotation for an object of the contribution data, wherein the first annotation for the object was previously entered prior to retrieving the first annotation;

a planning application to retrieve a context definition defining a context in which the first annotation was previously entered prior to retrieving the first annotation, wherein the context definition defines a particular cell of the sheet of the contribution data; and an annotation table to store the first annotation and the context definition corresponding to the first annotation, wherein the user interface generates a link to the context defined by the context definition and corresponding to the particular cell of the sheet representative of the contribution data in the multidimensional database, outputs the link in a graphical user interface, and displays the first annotation in the graphical user interface when the link is selected.

5. The computing device of claim 4,
wherein the annotation interface module is configured to receive at least two annotations for an object of the contribution data within the same context,
wherein the planning application is configured to retrieve coordinates defining the object within the context definition, and
wherein the annotation table is configured to store the coordinates.

6. The computing device of claim 4, wherein the annotation interface module is configured to store, with the first annotation: a user identifier to identify a user who entered the first annotation, a date identifier to identify the date on which the first annotation was entered, a value indicator to identify the value of the object at the time the first annotation was entered, and a comment field to present a comment from the user who entered the first annotation.

7. The computing device of claim 4, wherein the annotation interface module is configured to provide a commentary browser to output a link to the context defined by the context definition for the first annotation.

8. The computing device of claim 7, wherein the planning application is configured to cause the user interface to generate the sheet defined by the context associated with the link when the link is selected.

9. The method of claim 1, wherein the object comprises a first object, wherein the context definition comprises a first context definition, wherein the context comprises a first context, wherein the particular cell comprises a first particular cell, wherein the link comprises a first link, wherein the sheet comprises a first sheet, and wherein the method further comprises:

receiving, by the one or more processors, an indication of a user selection to produce an annotation list for the multidimensional database;

retrieving, by the one or more processors, a second annotation for a second object of the contribution data from the enterprise system, wherein the second annotation was previously entered prior to retrieving the second annotation;

retrieve, by the one or more processors, a second context definition defining a second context in which the second annotation was previously entered prior to retrieving the second annotation, wherein the second context corresponds to a second particular cell of a second sheet representative of the contribution data in the multidimensional database, the second sheet comprising a second two-dimensional cross-section of the multidimensional database characterized by full versions of two of the N dimensions and single values for each of the remaining N dimensions;

generating, by the one or more processors, a second link to the second context defined by the second context definition and corresponding to the second particular cell of the second sheet representative of the contribution data in the multidimensional database;

generating, by the one or more processors, an annotation list that includes the first link and the second link;

outputting, by the one or more processors, the annotation list in the graphical user interface; and displaying the second annotation in the graphical user interface when the second link is selected.

10. The computing device of claim 4, wherein the object comprises a first object, wherein the context definition comprises a first context definition, wherein the context comprises a first context, wherein the particular cell comprises a first particular cell, wherein the link comprises a first link, wherein the sheet comprises a first sheet, wherein the user interface further receives an indication of a user selection to produce an annotation list for the multidimensional database, wherein the annotation interface module further retrieves a second annotation for a second object of the contribution data from the enterprise system, wherein the second annotation was previously entered prior to retrieving the second annotation;

wherein the planning application further retrieves a second context definition defining a second context in which the second annotation was previously entered prior to retrieving the second annotation, wherein the second context corresponds to a second particular cell of a second sheet representative of the contribution data in the multidimensional database, the second sheet comprising a second two-dimensional cross-section of the multidimensional database characterized by full versions of two of the N dimensions and single values for each of the remaining N dimensions;

wherein the user interface further generates a second link to the second context defined by the second context definition and corresponding to the second particular cell of the second sheet representative of the contribution data in the multidimensional database, generates an annotation list that includes the first link and the second link, outputs the annotation list in the graphical user interface, and displays the second annotation in the graphical user interface when the second link is selected.

* * * * *